2 Sheets--Sheet 1.
A. A. HENDERSON.
Harvester-Rake.
No. 6,336. Reissued March 16, 1875.
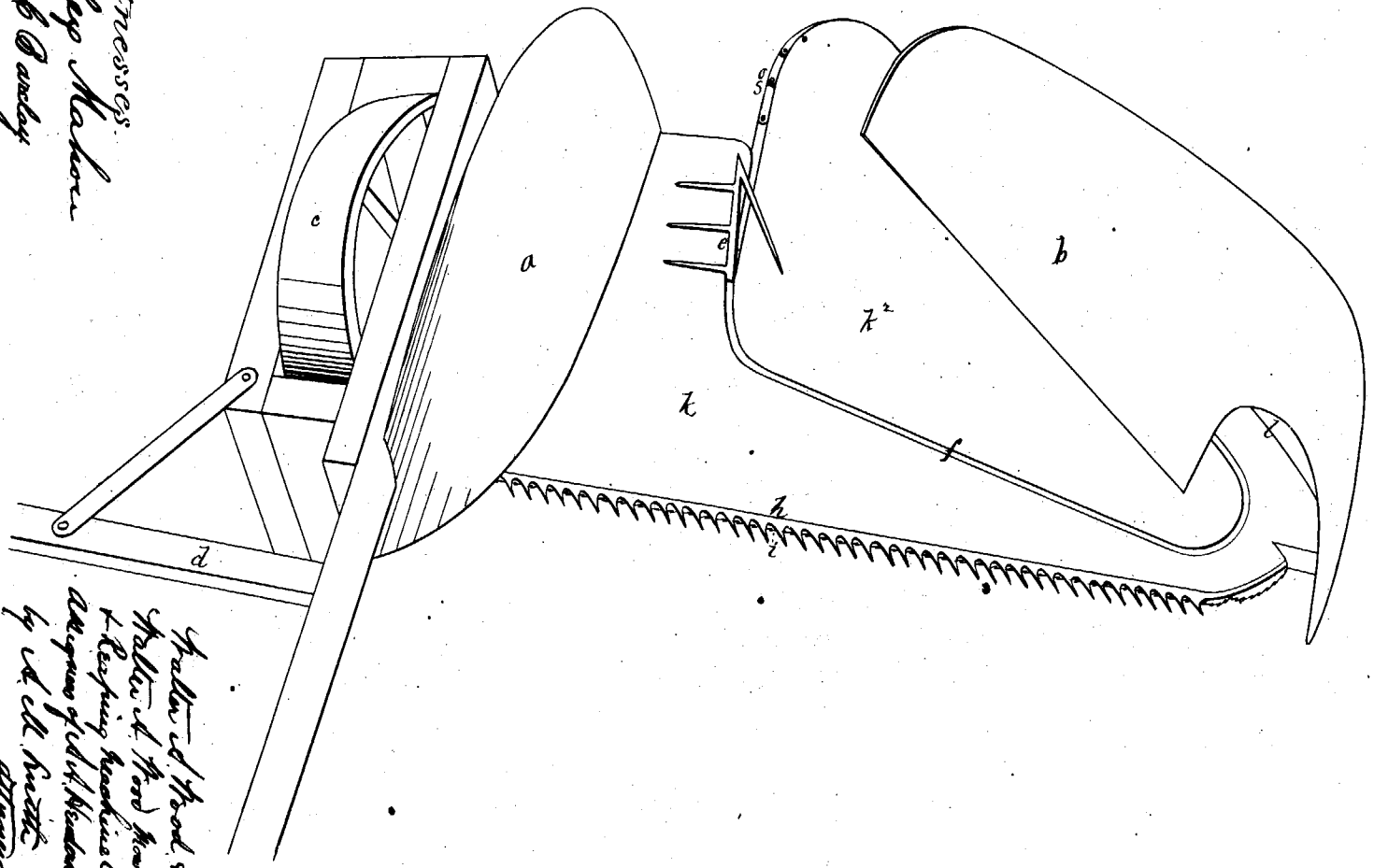
Witnesses.
Alex Mahon
H. C. Barclay
Walter A. Wood &
Walter A. Wood Mowing
& Reaping Machine Co.
Assignees of A. A. Henderson
by A. M. Ritchie
Attorney.
THE GRAPHIC CO. PHOTO-LITH. 39 & 41 PARK PLACE, N.Y.

2 Sheets--Sheet 2.
A. A. HENDERSON.
Harvester-Rake.
No. 6,336. Reissued March 16, 1875.
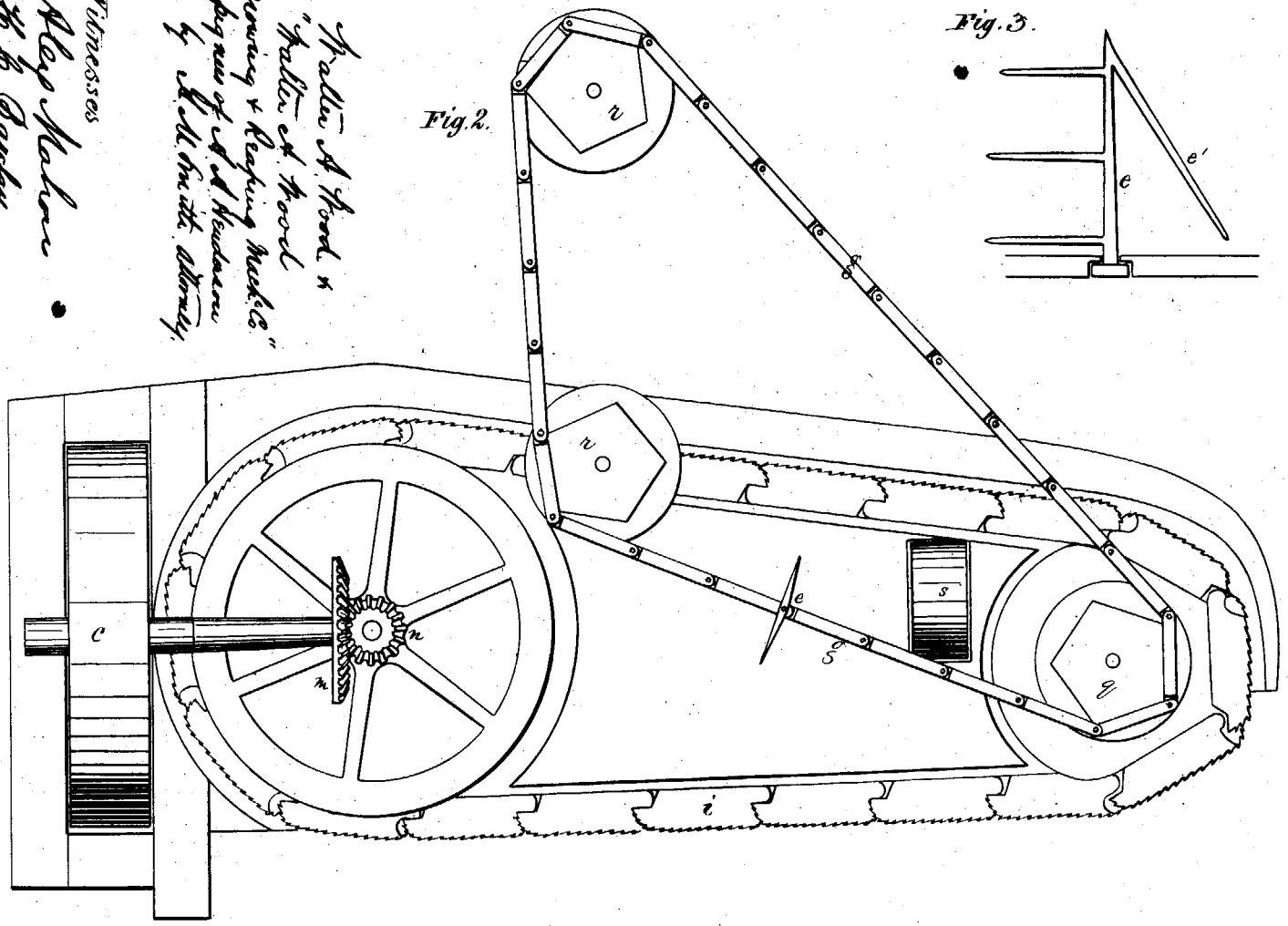
Walter A. Wood &
"Walter A. Wood
Mowing & Reaping Mach. Co."
Assignees of A. A. Henderson
by A. M. Smith Attorney.
Witnesses
Alex Mahon
H. C. Barclay.
THE GRAPHIC CO. PHOTO-LITH. 39 & 41 PARK PLACE, N.Y.

UNITED STATES PATENT OFFICE.

ANDREW A. HENDERSON, OF BROOKLYN, ASSIGNOR, BY MESNE ASSIGNMENTS, TO WALTER A. WOOD AND THE WALTER A. WOOD MOWING AND REAPING MACHINE COMPANY, OF HOOSICK FALLS, NEW YORK.

IMPROVEMENT IN HARVESTER-RAKES.

Specification forming part of Letters Patent No. 29,594, dated August 14, 1860; extended seven years; reissue No. 6,336, dated March 16, 1875; application filed February 1, 1875.

*To all whom it may concern:*

Be it known that I, ANDREW A. HENDERSON, (formerly of Huntington county, Pennsylvania, but now) of Brooklyn, county of Kings and State of New York, did invent certain new and useful Improvements in Reaping-Machines, and that the following, taken in connection with the drawings, is a full, clear, and exact description thereof.

These improvements were described by me in Letters Patent granted August 14, 1860, and numbered 29,594, of which patent this is a reissue. The patent, as originally granted, described improvements in the cutting apparatus of reapers, as well as in the apparatus for raking the cut grain off the platform and depositing it in gavels upon the ground.

Experience has proved that the cutting apparatus described in the patent is of no practical value, whereas the same experience has proved that the raking apparatus is of great value. In this reissue, therefore, no claim is made to the cutting apparatus, and the latter will, therefore, be described no further than by the drawings, which give to one conversant with reapers a sufficient description of the same.

In the drawings, Figure 1 represents a perspective view of the machine. Fig. 2 is a plan view of the same with the platform removed, and Fig. 3 is a side elevation of the rake.

In these drawings a table or platform, $k$ $k^2$, is represented like that of an ordinary reaper, supported upon proper wheels $c$ $s$. At the front side of this platform is a cutting apparatus, $h$ $i$, in the usual location, and at one side of the platform or bed there is what I term a side board or compress-board, $a$, and moving upon the platform in an endless circuitous path is a rake-head, $e$, provided with teeth, which lie parallel with the platform. This rake at its lower end passes through a slit, $f$, and is secured to and supported by an endless chain, $g$, lying below the upper surface of the platform, and running around three pulleys, $q$ $r$ $r$, whose upper surfaces are also below the surface of the platform. Another side board, $b$, is shown, with an aperture, $l$, in it, through which the rake passes just before commencing to traverse the platform in rear of the cutting apparatus. The rake during part of its circuit travels partly under and behind this said board $b$, and is by it protected from the falling grain during a portion of its revolution or circuit. Motion is imparted to one of the pulleys, $q$, from the driving-wheel of the machine by means of gears $m$ $n$ and chain $i$, as can easily be traced upon the drawings. As this pulley revolves it causes the rake-chain to move around the other two pulleys, which are partially surrounded by it, thus carrying the rake in its path. The rake, as the machine travels along the ground, comes out of the opening in the side board $b$, then traverses the platform in rear of the cutters, sweeping the cut grain sidewise across the platform. As it (the rake) swivels around the pulley nearest the compressing-board $a$ the teeth turn, and, entering the gavel like a pitch-fork, compress the gavel against the compressing-board, and then, moving rearward, (the teeth being inserted in the gavel,) carry the gavel with the heads of the grain in advance along the platform until the gavel passes over the edge thereof and drops upon the ground. The rake then returns, so as to be ready again to traverse the platform in rear of the cutters.

The necessary motions of the rake to gather, compress, and discharge a gavel are, therefore, first, to traverse the platform in rear of the cutters, so as to sweep the cut grain sidewise against the compressing-board; second, to swivel around so that its teeth will enter the gavel and compress it by the aid of the compressing-board; and, third, to retreat toward the rear of the machine, drawing the gavel along with the heads of the grain in advance, and with the teeth in the gavel over the platform, and finally discharging the gavel upon the ground. In order to discharge the next gavel the rake must return to the position where it commenced to gather the first gavel.

The table or platform supports the grain, so that the rake may act upon it, and the compressing-board enables the rake to compress the grain thus supported into a gavel.

The rake-head is fastened to one of the links of the chain, and is shown provided with a rear prong, *e'*, (see Fig. 3,) which is sometimes effective in aiding the rake in sweeping the grain sidewise. The rake-teeth lie substantially parallel with the platform, and are arranged one above another, the rake-head, or that portion of it to which the teeth are connected, being perpendicular to the plane of the platform, the teeth having this position, in order that they may enter the gavel pitchfork fashion, as before described.

The chain and pulleys are located beneath the upper surface of the platform, in order that they may be out of the way of the grain.

What I claim as of my own invention, and desire to secure by Letters Patent, is—

1. An automatic grain-rake, provided with teeth lying parallel with the platform and moving across said platform in rear of the cutters, in combination with a stationary side board, against which the grain is pressed by the rake in being moved to the ground, substantially as described.

2. The combination, with the grain-platform of a reaper, of a rake-head, having substantially horizontal teeth, said head being supported at its lower end and moving in a circuitous path upon the plane or surface of the platform for removing the grain therefrom, substantially as described.

3. An automatic rake, in combination with a platform and mechanism for actuating the rake, located below the upper surface of the platform, the combination being substantially such as hereinbefore set forth.

ANDREW A. HENDERSON.

Witnesses:

FRANCIS P. BURKE,

C. BURNHAM.